Patented Nov. 21, 1944

2,363,146

UNITED STATES PATENT OFFICE 2,363,146

METHOD OF MAKING CERAMIC BONDED ARTICLES

Norman P. Robie, Niagara Falls, N. Y., assignor to The Carborundum Company, Niagara Falls, N. Y., a corporation of Delaware No Drawing. Application July 6, 1939, Serial No. 283,067

5 Claims. (Cl. 51—308)

This invention relates to a method of making ceramic bonded articles such as grinding wheels and stones, refractories, filtering media, tile and the like. More particularly it relates to a method of ceramically bonding these articles in which the articles are formed by casting the wet mix in molds, a particular feature of the invention being the incorporation in the casting mixes of resins in one form or another, especially resins of the heat-hardenable type. Uniform, porous wheels can be formed by the inclusion of pore-forming materials.

Abrasive products are generally formed by a pressing or a casting process. In the pressed wheel process abrasive granules, permanent bond and a small amount of a temporary binder are mixed with a small amount of water, just enough water being used to cause the mix to cohere after pressing. In the puddled wheel or slip-casting process a much larger amount of water, together with a small amount of temporary binder, is used in order that the mix may be poured or cast into molds.

Hitherto the puddling or slip-casting process has not received more consideration because of the inability with it to obtain a uniform structure, the porosity of the puddled or cast article, as for example, abrasive wheels, being irregular, the final product often showing undesirable soft spots. Uneven distribution of the air trapped in the mix caused a lack of homogeneity in the body structure.

For these and other reasons by far the greater number of abrasive wheels have been formed by pressing, entailing the use of expensive pressing apparatus and mold equipment. More recently efforts to make wheels by puddling or casting have been renewed in which latex has been used as a temporary bond in the casting mix. However this has not been entirely satisfactory because of the highly sensitive nature of rubber latices towards numerous external influences whereby it has been extremely difficult and often impossible to handle many mixtures without premature coagulation and setting up of the mix before it has been poured into the molds.

It is the object of this invention to set forth an improved casting process of making ceramic bonded abrasive wheels and similar articles which overcomes the above difficulties and at the same time is an efficient and substantially foolproof procedure.

A further object is to give a process by which abrasive wheels can be manufactured which will be more uniform and homogeneous in structure and in which accurate control can be maintained over the porosity.

A still further object of the present invented process is the ability to make abrasive wheels of a greater range of controlled structures by the proper choice and manipulation of mix ingredients. The invention also opens up for use in connection with ceramic-bonding a group of materials of widely varying characteristics whereby a casting mix of the desired properties may be obtained.

In accordance with the present invention ceramic bonded articles are made, by the casting process, by mixing resins with the ceramic bond and the granular material to be bonded with water added to yield a plastic mix of castable consistency. Pore-forming materials are incorporated if a porous article is desired. This mix is then cast or trowelled in a mold of the desired shape, dried, and fired to progressively cure or heat-harden the resin, after which the organic matter is ultimately destroyed and driven off and the ceramic bond sintered or fused. While broadly speaking this is the general procedure used in carrying out the invention the process is capable of numerous variations in detail which however do not depart basically from the method as above stated.

For example, the resins used may be employed in either the dry or liquid state and may be incorporated in the mix dry or in the form of solutions, emulsions or dispersions, depending upon the particular ingredients and the type of structure desired in the final product. Also the stage in the mixing process at which the resin is added and the manner of its handling will vary according to the form in which it is being used as will be apparent from the several examples set forth below. Various wetting agents and other organic chemical substances may be used with the resins to help to impart definite desired properties to the mix. Proprietary wetting, dispersing and emulsifying agents which may be used include such materials as "Aresklene," a sulfonated alkylated oxydiphenyl; "Nekal BX," a sodium alkyl naphthalene sulfonate; "Igepon A," made by causing isethionic acid or its salt to combine with oleic acid or its derivatives, and others such as those listed in leaflet E–426 of the U. S. Department of Agriculture Bureau of Etomology and Plant Quarantine, "A List of Proprietary Detergents, Wetting Agents, and Emulsifying Agents."

The casting mix is either poured or trowelled into the mold, depending upon the consistency of the casting mix. Consolidation of the mold contents is promoted by an accompanying jolting or tamping operation, which also serves to remove air bubbles from the mold contents, after which the mold and contents are placed in an oven and dried. The temperature is then raised sufficiently to cure or set-up the resin in the mix. The mold is then removed from the oven and the article taken out of the mold and fired to drive out the organic matter and fuse the ceramic bond.

Instead of firing the cast formed article to a temperature at which the ceramic bond becomes vitrified and the resin temporary bond is destroyed, the temperature of the cast article, after drying, may be taken up only to the point at which the resin is thoroughly cured. Abrasive articles cured in this manner will have the ceramic bond present in the final article as an inorganic filler and the bonded strength of the object will depend upon the resin. Wheels of this type may be made from casting slips in which the resin is incorporated with the abrasive without the use of ceramic ingredients and then heated to a point where the resin is thoroughly cured.

In order to bring out more clearly the exact nature of the present invention the following specific examples are given by way of illustration.

Example I

A casting mixture is made as follows:

|  | Grams |
|---|---|
| 36 grit white fused alumina grain | 940 |
| 40 grit white fused alumina grain | 940 |
| Finely powdered raw ceramic bond | 120 |
| Pulverized heat-hardenable phenol-formaldehyde resin | 40 |
| Diglycol stearate dispersion containing 50 grams of solid diglycol stearate in 2250 cc. of water | 300 |

The pulverized materials are mixed uniformly and then thoroughly mixed with the alumina grain. The diglycol stearate dispersion is then slowly fed into the mixture of abrasive grain and powdered materials with constant mixing until all of the dry ingredients have been suspended to give a wet plastic mixture. An absorbent plaster mold is coated with mica flakes. The above plastic mix is then poured into the mold and puddled and jolted to form a homogeneous, even filling of the mold, and the excess mixture scraped off.

The time of drying varies with the size, shape and composition of the article being formed. In this example an abrasive wheel 8 inches in diameter by ½ inch thick is being made with one face exposed to the air when formed in the mold. A drying period of 20 hours at 125° F. is found to be sufficient for this size wheel. After drying, during which time the resin is cured to a degree which gives the molded article mechanical strength, the article is removed from the mold and placed on suitable supports in a kiln and fired to decompose the organic binder and fuse the ceramic bond to the abrasive grits.

Example II

In this example a heat-hardenable, reactive phenolic resin is used in the form of an emulsion. The resin emulsion is prepared in the following manner. 400 grams of A stage heat-hardenable powdered phenol-formaldehyde resin is mixed uniformly with 600 grams of A stage heat-hardenable, liquid, phenol-formaldehyde resin, and the mixture heated to produce a viscous solution. A solution of 200 grams of gum acacia in 300 cc. of water is then slowly stirred into the viscous liquid resin mixture and 500 cc. of additional water are added to give the desired consistency. Excessive heating must be avoided in order to prevent any breaking down of the emulsion. The emulsion is improved by pumping it through a homogenizer twice which gives a more uniform, finer dispersed and more stable product. This emulsion is used in making the casting mix according to the following proportions:

| | |
|---|---|
| 40 grit fused alumina grain _____grams__ | 1,840 |
| Pulverized ceramic bond containing clay _____grams__ | 160 |
| Resin emulsion (as prepared above) __do____ | 50 |
| Water _____cc__ | 225 |

The ingredients are mixed uniformly and poured into a plaster mold for making wheels 8 inches in diameter and ¾ of an inch thick. The mold previous to use is greased well with a graphite grease. The cast mix in the mold is puddled and jolted to improve homogeneity and then dried at 125° F. for 16 hours. The cast and dried wheel is then removed from the mold and fired as in Example I.

Example III

In this example the resin is incorporated in the mix in the form of a solution. The resin solution used is an aqueous ammoniacal solution of an alkyd resin and is made as follows:

| | |
|---|---|
| Soluble solid alkyd resin of sufficient acidity to be soluble in aqueous alkali and known as "Rezyl #10" _____grams__ | 300 |
| Water _____do____ | 180 |
| Concentrated aqueous ammonia _____cc__ | 20 |

This resin solution is admixed with the abrasive grain and pulverized ceramic bond, and water added to form a wet mix of the following proportions:

| | |
|---|---|
| 36 grit white fused alumina grain____grams__ | 940 |
| 40 grit white fused alumina grain____do____ | 940 |
| Pulverized ceramic bond ingredients containing clay _____grams__ | 120 |
| The above alkyd resin solution_____cc__ | 100 |
| Water _____cc__ | 100 |

This mixture, when thoroughly mixed, is of a less fluid consistency and when prepared is poured into the mold and trowelled flat to fill a mold level with the top to form a wheel shape 8 inches in diameter and ¾ inch thick. After drying 16 hours at 125° F. it is removed from the mold and fired the same as in Example I.

Example IV

In this example the same resin emulsion is used as in Example II. However, a commercial wetting agent is included which permits of using less water so as to yield a mix suitable for tamping into molds. The mix ingredients are as follows:

| | |
|---|---|
| 36 grit white fused alumina grain____grams__ | 940 |
| 40 grit white fused alumina grain____do____ | 940 |
| Pulverized ceramic bond ingredients containing clay _____grams__ | 120 |
| Resin emulsion as in Example II_____do____ | 50 |
| Commercial wetting agent solution consisting of 50 grams "Nekal BX" in 200 cc. of hot water _____cc__ | 20 |
| Water _____cc__ | 100 |

This mix is placed in a plaster mold well coated with graphite grease. The mix is then uniformly tamped to form a wheel shape 8 inches in diameter and ¾ inch thick, and dried at 125° F. for 22 hours. The casting produced is dense and uniform. This casting is then removed from the mold and fired the same as in the previous examples.

Example V

The resin used in this example is a very finely pulverized, fusible, heat reactive, heat hardenable, phenol-formaldehyde resin. The ingredients are mixed in the following proportions.

| | |
|---|---|
| 36 grit white fused alumina grain___grams__ | 1,880 |
| 40 grit white fused alumina grain____do____ | 1,880 |
| Pulverized ceramic bond ingredients containing clay_____grams__ | 240 |
| Pulverized heat-hardenable phenol-formaldehyde resin_____grams__ | 80 |
| Commercial wetting agent solution as in Example IV_____cc__ | 30 |
| Water_____cc__ | 125 |

This mix is very uniformly tamped into a 6 inch by 8 inch by 1½ inch thick curved segment mold and dried 24 hours at 125° F. The dried casting is then removed from the mold and fired as in Example I.

Example VI

In this example, a powdered resin is used and a pore-forming material is incorporated in the mix to form a porous grinding wheel. The following ingredients are thoroughly mixed and screened to uniformity.

| | |
|---|---|
| 80 grit fused alumina grain_____grams__ | 2,000 |
| Pulverized ceramic bond ingredients containing clay_____grams__ | 750 |
| Powdered phenol-formaldehyde resin grams__ | 325 |
| Water_____cc__ | 750 |

After the above ingredients have been thoroughly mixed, 150 cc. of water containing 20 cc. of 30% hydrogen peroxide solution is added for the purpose of forming pores in the final formed article. The entire mix is then poured in a plaster wheel mold and quickly puddled to uniformity. After standing 16 hours in air, to permit pore formation and partial drying, the wheel, while still in the mold, is oven dried at 150° F. for one hour, followed by three hours at 235° F. to cure the resin. The wheel is then removed from the mold and fired to fuse the ceramic bond.

Example VII

A cast abrasive hone was made, wherein the ceramic bond was used as a filler for the resin binder. The heat treatment used was sufficient to mature the resin binder, but insufficient to flux the ceramic bond and burn out the organic binder. The following mixture was made into a slurry.

| | Grams |
|---|---|
| 180 grit emery_____ | 840 |
| Powdered heat reactive phenolic resin_____ | 100 |
| Powdered ceramic bond containing plastic clays_____ | 100 |
| Sufficient water to make a slurry holding abrasive in suspension, approximately____ | 392 |

The above mixture is cast into a porous mold and dried. The dry casting is then slowly heated to 350° F. to mature the phenolic resin bond.

These examples have given the various modifications in form, such as dry powders, solutions, emulsions and dispersions, in which resins may be incorporated in the mixes. Other resins may be similarly used. The porosity and grade of hardness varies with the type and form of resin used, the use of pore-forming materials and the method of casting the mixes into the molds. Numerous shapes in addition to the wheel shapes given can be made and other abrasive or refractory grain can be used. The consistency of the mixes can be varied by using a wetting agent and varying the amount of water. The mixes can be cast, vibrated or jolted with or without a weight on the mix, or trowelled in the molds depending on the consistency of the mix, and the porosity desired.

By forming ceramic bonded grinding wheels and other ceramic bonded abrasive articles by casting processes in which resin temporary bonds are used, several advantages are gained. By the elimination of costly steel molds and pressing equipment, the manufacturing costs are lowered. The present method also helps to increase production and also permits the making of intricately shaped articles heretofore impractical to make. Casting mixes containing resins as temporary bonds also possess several advantages over mixes using rubber latex as a temporary bond. The resin mixes do not tend to set-up or be otherwise adversely effected by external influences such as by slight acid or alkali impurities or conditions likely to be present in the mix, and they are therefore easier to handle without undue premature settling out or coagulation prior to being cast into the molds. Articles made by the process have a uniform, even porosity and a homogeneous structure. As can readily be seen by the specific examples given, a much wider range of body structure in the finished product is attainable than was heretofore possible.

While for the most part the invention has been described as pertaining to abrasive wheels, as previously pointed out, the process is applicable to the making of many other ceramic bonded granular products. Having set forth the invention it is not intended to be limited other than by the scope of the appended claims.

I claim:

1. In the method of making a ceramic-bonded abrasive article the steps which comprise forming a mixture of abrasive particles and pulverized ceramic bond, plasticizing said mixture by incorporating a resin emulsion therein as a suspending means for the abrasive particles and the ceramic bond, adding water and mixing to form a slurry of a consistency suitable for casting but too thin for pressing, casting the mix in a mold and consolidating to form an article of the desired shape, drying said formed article, and firing to remove the organic matter and fuse the ceramic bond.

2. In the method of making a ceramic bonded abrasive article the steps which comprise forming a mixture of abrasive particles and pulverized ceramic bond, plasticizing said mixture by incorporating a resin dispersion therein as a suspending means for the abrasive particles and the ceramic bond, adding water and mixing to form a slurry of a consistency suitable for casting but too thin for pressing, casting the mix in a mold and consolidating to form an article of the desired shape, drying said formed article, and firing to remove the organic matter and fuse the ceramic bond.

3. In the method of making a ceramic bonded abrasive article the steps which comprise forming a mixture of abrasive particles and pulverized ceramic bond, plasticizing said mixture by incorporating a resin solution therein as a suspending means for the abrasive particles and the ceramic bond, adding water and mixing to form a slurry of a consistency suitable for casting but too thin for pressing, casting the mix in a mold and consolidating to form an article of the desired shape, drying said formed article, and firing to remove the organic matter and fuse the ceramic bond.

4. A casting slip for making ceramic bonded abrasive articles comprising a thin slurry of abrasive particles and a pulverized ceramic bond suspended in a solution containing a heat-hardenable resin, said slurry being of a consistency suitable for casting but too thin for pressing.

5. A casting slip for making ceramic bonded abrasive articles comprising a thin slurry of abrasive particles and a pulverized ceramic bond suspended in a solution of a heat-hardenable resin, said slurry being of a consistency suitable for casting but too thin for pressing.

NORMAN P. ROBIE.